United States Patent
Tena Han et al.

(10) Patent No.: US 10,513,226 B2
(45) Date of Patent: Dec. 24, 2019

(54) STORAGE SYSTEM FOR RETAINING SMALL ITEMS IN A CONFINED SPACE WITHIN A LARGER CARGO AREA OF A MOTOR VEHICLE

(71) Applicant: FORD GLOBAL TECHNOLOGIES, LLC, Dearborn, MI (US)

(72) Inventors: Luis Adrian Tena Han, Tlalnepantla de Baz (MX); Carmen Frida Vargas Garcia, Cuautitlan Izcalli (MX)

(73) Assignee: Ford Global Technologies, LLC, Dearborn, MI (US)

( * ) Notice: Subject to any disclaimer, the term of this patent is extended or adjusted under 35 U.S.C. 154(b) by 57 days.

(21) Appl. No.: 15/698,757

(22) Filed: Sep. 8, 2017

(65) Prior Publication Data
US 2019/0077320 A1    Mar. 14, 2019

(51) Int. Cl.
*B60R 7/02* (2006.01)
*B60R 11/00* (2006.01)

(52) U.S. Cl.
CPC ......... *B60R 7/02* (2013.01); *B60R 2011/0036* (2013.01); *B60R 2011/0063* (2013.01); *B60R 2011/0082* (2013.01); *B60R 2011/0087* (2013.01)

(58) Field of Classification Search
CPC ..... B60R 2011/0036; B60R 2011/0082; B60R 2011/0063; B60R 2011/0087; B60R 7/02; B60R 5/04

USPC ....................................................... 296/37.14
See application file for complete search history.

(56) References Cited

U.S. PATENT DOCUMENTS

| | | | |
|---|---|---|---|
| 4,226,348 A | 10/1980 | Dottor et al. | |
| 5,340,183 A | 8/1994 | Horian | |
| 5,538,148 A | 7/1996 | Indyk | |
| 6,015,071 A | 1/2000 | Adomeit et al. | |
| 6,682,118 B2 * | 1/2004 | Ryan | B60R 11/00 296/37.16 |
| 7,143,932 B2 | 12/2006 | Wang | |
| 7,201,421 B2 | 4/2007 | Reynolds et al. | |
| 8,029,219 B2 * | 10/2011 | Toutant | B60P 7/0892 410/129 |
| 2003/0218347 A1 | 11/2003 | Gehring et al. | |
| 2016/0318451 A1 | 11/2016 | Li | |

FOREIGN PATENT DOCUMENTS

CA    2474534 A1    1/2005

* cited by examiner

*Primary Examiner* — Joseph D. Pape
*Assistant Examiner* — Dana D Ivey
(74) *Attorney, Agent, or Firm* — Vichit Chea; King & Schickli, PLLC

(57) ABSTRACT

Various storage system embodiments are described. Each storage system is displaceable between a stowed position and an erected configuration wherein the storage system provides a storage compartment for retaining and protecting smaller delicate items from being displaced and potentially damaged within the greater expanse of a cargo compartment of a motor vehicle.

10 Claims, 11 Drawing Sheets

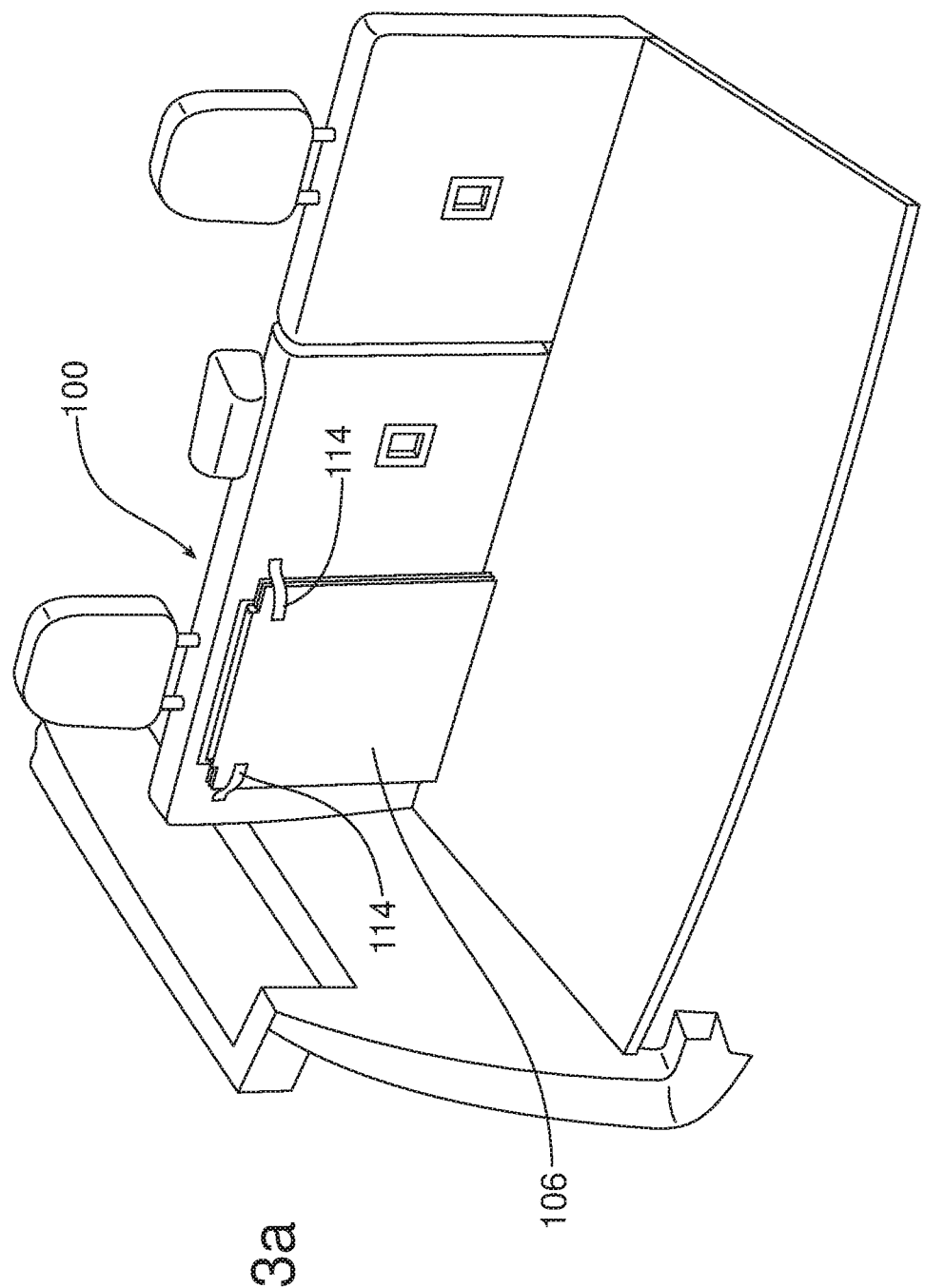

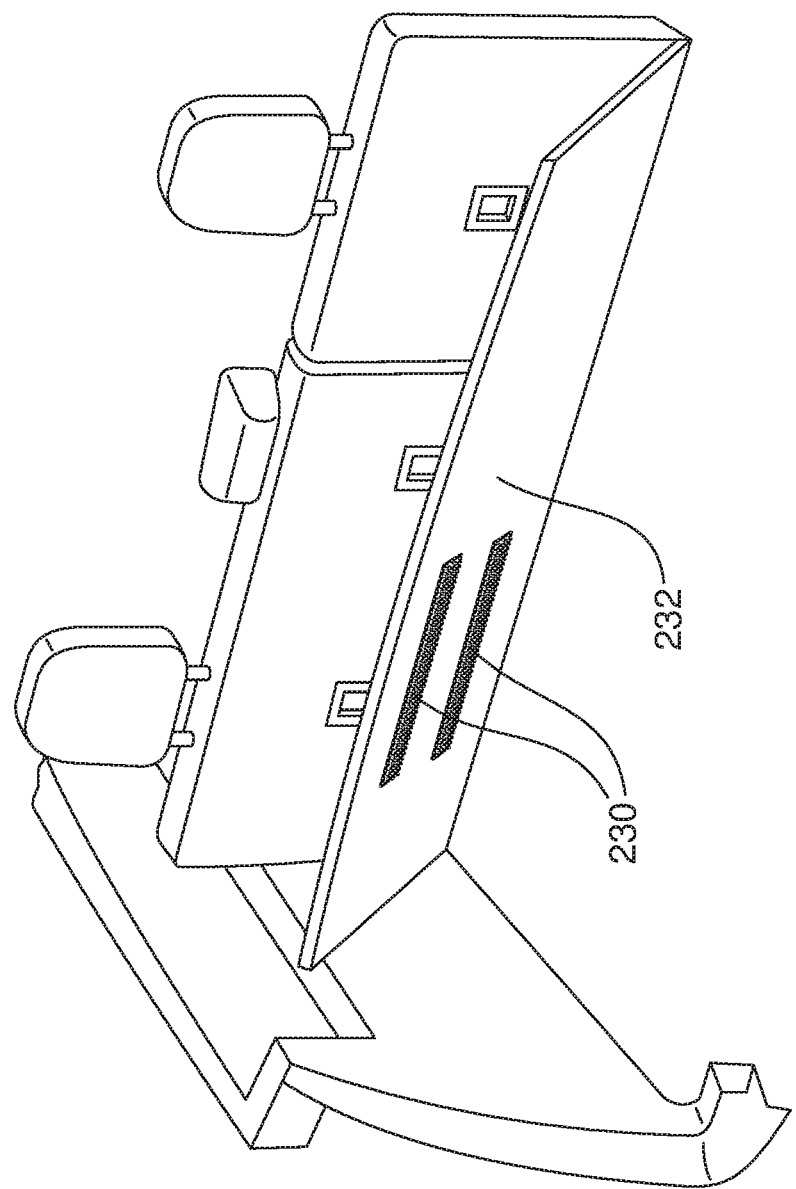

STORAGE SYSTEM FOR RETAINING SMALL ITEMS IN A CONFINED SPACE WITHIN A LARGER CARGO AREA OF A MOTOR VEHICLE

TECHNICAL FIELD

This document relates generally to the motor vehicle equipment field and, more particularly, to a storage system particularly adapted for safely retaining small items within a confined space within a larger cargo compartment or area of a motor vehicle.

BACKGROUND

The cargo compartment of a motor vehicle, whether that compartment is a trunk of a coup or sedan or a cargo floor of a sport utility or crossover vehicle, is typically a relatively expansive area. When small items are transported in such a cargo area, G forces generated when accelerating, decelerating or cornering in the motor vehicle have a tendency to shift those items in the cargo compartment. Fragile items such as lightbulbs or eggs may be damaged when shifted into the wall of the cargo compartment. Other loose, heavy items might also shift or roll, changing positions in the trunk. In such a situation those heavier items may engage and damage a fragile item.

This document relates to a new and improved storage system that on one hand may be conveniently stowed in a convenient manner with minimal adverse effect on the total storage space of the cargo area and on the other hand may be quickly and easily erected to retain small items in a confined area so as to protect them from damage during the operation of the motor vehicle.

SUMMARY

In accordance with the purposes and benefits described herein, a new and improved storage system is provided for retaining and protecting small items in a relatively confined area within the larger expanse of a storage compartment of a motor vehicle. In a first possible embodiment, that storage system comprises a plurality of panels having perimeters including a first set of crenulations allowing the plurality of panels to be interconnected into a multiwalled structure defining a storage compartment.

The storage system may include a receiver formed in a cargo compartment floor. The plurality of panels may be received and held in the receiver when stowed. That receiver may comprise a recessed bottom wall and a plurality of sidewalls having a second set of crenulations cooperating to receive and hold the first set of crenulations on the plurality of panels when those panels are in the stowed position.

Still further, the first set of crenulations may include a plurality of alternating lugs and notches. Further, lug receivers may be provided in the sidewalls of the cargo compartment. In addition, lug receivers may be provided in a rear face of a rear seat oriented toward the cargo compartment and in the recessed bottom wall of the receiver in the cargo compartment floor.

In a first configuration, the projecting lugs on a first panel of the plurality of panels may be received in the first set of lug receivers in the sidewalls of the cargo compartment and the third set of lug receivers in the recessed bottom wall. Further, projecting lugs of a second panel of the plurality of panels may be received in the second set of lug receivers in the rear face of the rear seat and the notches of the first panel.

Alternatively, projecting lugs of the first panel of the plurality of panels may be received in the second set of lug receivers in the rear face of the rear seat and the third set of lug receivers on the recessed bottom wall.

In a second possible embodiment, the storage system comprises a first accordion sidewall, a second accordion sidewall, a first end wall spanning the first accordion sidewall and the second accordion sidewall and a second end wall connected to the first accordion sidewall, the second accordion sidewall and a face of the rear seat.

The face of the rear seat may further include a receiver and the second end wall may nest inside that receiver. Still further, a fastener may be provided to secure the first accordion sidewall, the second accordion sidewall and the first end wall in a collapsed position nested within the receiver on the face of the rear seat. That fastener may comprise a hook and look fastening device.

A third embodiment of the storage system comprises a storage container including a first sidewall, a second sidewall, a third sidewall and a fourth sidewall all depending from a bottom wall. In addition, the storage system comprises a first fastening element, on a first side of a storage compartment floor, for securing the storage container in an erected configuration and a second fastening element, on a second side of the storage compartment floor, for securing the storage container in a collapsed and flat configuration.

The storage system may further include a third fastening element fixed to the bottom wall. The third fastening element may be releasably connected to either the first fastening element or the second fastening element. The first fastening element, the second fastening element and the third fastening element may be cooperating hook and loop fasteners.

The first sidewall, the second sidewall, the third sidewall and the fourth sidewall may all be made from a flexible material. In addition, a first support post may be provided between the first sidewall and the second sidewall. A second support post may be provided between the second sidewall and the third sidewall. A third support post may be provided between the third sidewall and the fourth sidewall. A fourth support post may be provided between the fourth sidewall and the first sidewall. In other words, a support post is provided at each corner of the storage container.

In addition, the storage system may include an upper rim. That upper rim may have an inner margin defining an access opening to a storage area defined by the first sidewall, the second sidewall, the third sidewall, the fourth sidewall and the bottom wall when the storage system is in the erected configuration.

In the following description, there are shown and described several preferred embodiments of the storage system. As it should be realized, the storage system is capable of other, different embodiments and its several details are capable of modification in various, obvious aspects all without departing from the storage system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the storage system and together with the description serve to explain certain principles thereof.

FIG. 1 is a perspective view of a first embodiment of the storage system wherein the plurality of panels of that system are held in a stowed position within a receiver formed in a cargo compartment floor.

FIGS. 2a-2c are perspective views of the first embodiment of the storage system illustrated in FIG. 1 but illustrating those panels in three different erected configurations in order to show the versatility of the storage system for constructing or erecting various multiwalled structures defining storage compartments defining a confined space for different small items at different locations in the cargo compartment.

FIGS. 3a and 3b are perspective views of a second possible embodiment of storage system, illustrating that second embodiment in respective collapsed and expanded positions.

FIGS. 4a-4e are a series of views of a third possible embodiment of storage system.

FIG. 4a is a perspective view illustrating a first fastening element on a top or first side of the storage compartment floor and adapted to hold a storage container of the third embodiment in a collapsed or erected configuration.

FIG. 4b is a perspective view illustrating a second fastening element on a lower or second side of the storage compartment floor and adapted to hold the storage container in a collapsed and flat configuration concealed below the storage compartment floor.

FIG. 4c is a perspective view illustrating how the storage container may be converted between the collapsed and flat storage configuration and the erected configuration.

FIG. 4d is a perspective view illustrating the storage container in the erected configuration and secured in place on the storage compartment floor by means of the first fastening element secured to a first side of that storage compartment floor and a third fastening element fixed to the bottom wall of the storage container.

FIG. 4e is a perspective view illustrating the storage container in the collapsed and flat configuration and attached to the second fastening element on the lower or second side of the storage compartment floor.

Reference will now be made in detail to the present preferred embodiments of the storage system, examples of which are illustrated in the accompanying drawing figures.

DETAILED DESCRIPTION

Figure 1:
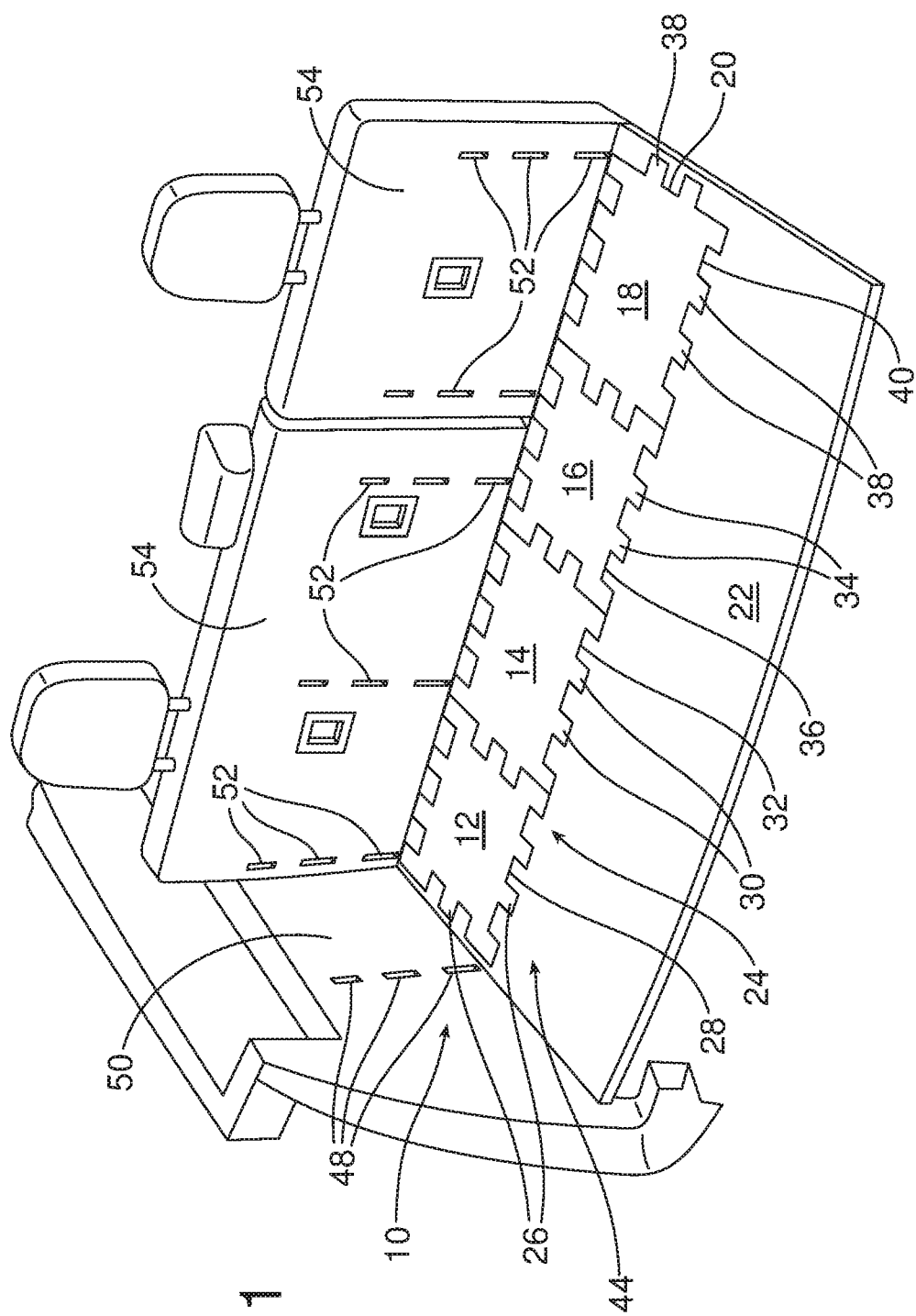

Reference is now made to FIGS. 1 and 2a-2c illustrating a first possible embodiment of storage system 10. The storage system 10 includes a plurality 12, 14, 16, 18 of panels. In the illustrated embodiment, the storage system 10 includes a first panel 12, a second panel 14, a third panel 16 and a fourth panel 18. In FIG. 1, the first panel 12, the second panel 14, the third panel 16 and the fourth panel 18 are illustrated in a stowed position where they are received and held in a receiver 20 formed in the cargo compartment floor 22.

As should be appreciated from reviewing drawing FIGS. 1 and 2a-2c, each of the four panels 12, 14, 16, 18 has a perimeter including a first set of crenulations, generally designated by reference numeral 24.

More specifically, the first set of crenulations comprises alternating lugs 26 and notches 28 on the first panel 12, alternating lugs 30 and notches 32 on the second panel 14, alternating lugs 34 and notches 36 on the third panel 16 and alternating lugs 38 and notches 40 on the fourth panel 18.

The receiver 20 in the cargo compartment floor 22 comprises a recessed bottom wall 42 and sidewalls having a second set of crenulations 44 that cooperate to receive and hold the first set of crenulations 24 around the perimeters of the four panels 12, 14, 16, 18. More specifically, the second set of crenulations 44 lie in the plane of the cargo compartment floor 22 so that the first and second sets of crenulations 24, 44 are integrated when the four panels 12, 14, 16, 18 rest on the recessed bottom wall with the upper face of the panels flush with the cargo compartment floor: that is, when the four panels are nested and stored in the receiver 20. See FIG. 1.

Figure 2A:
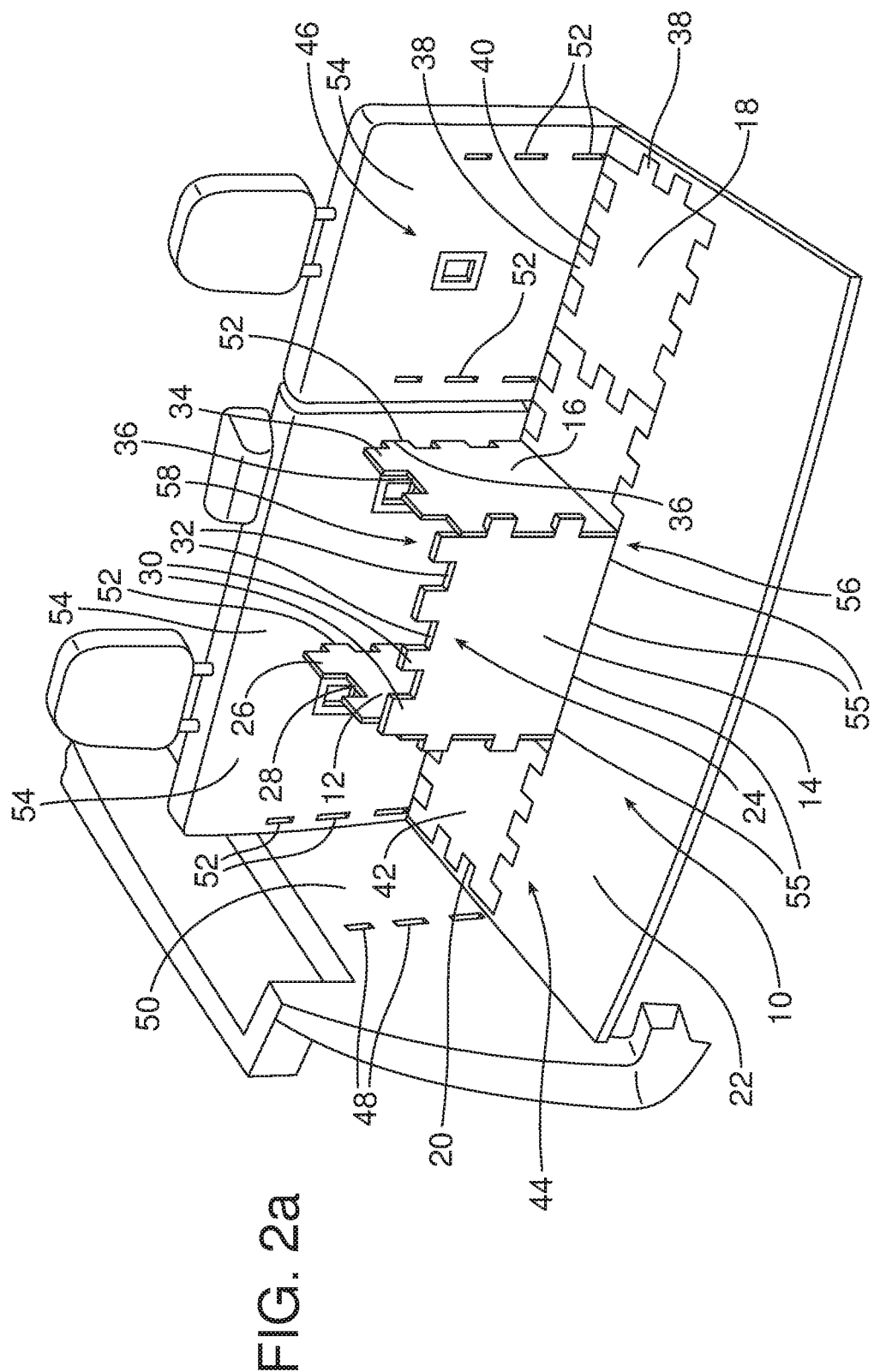
Figure 2B:
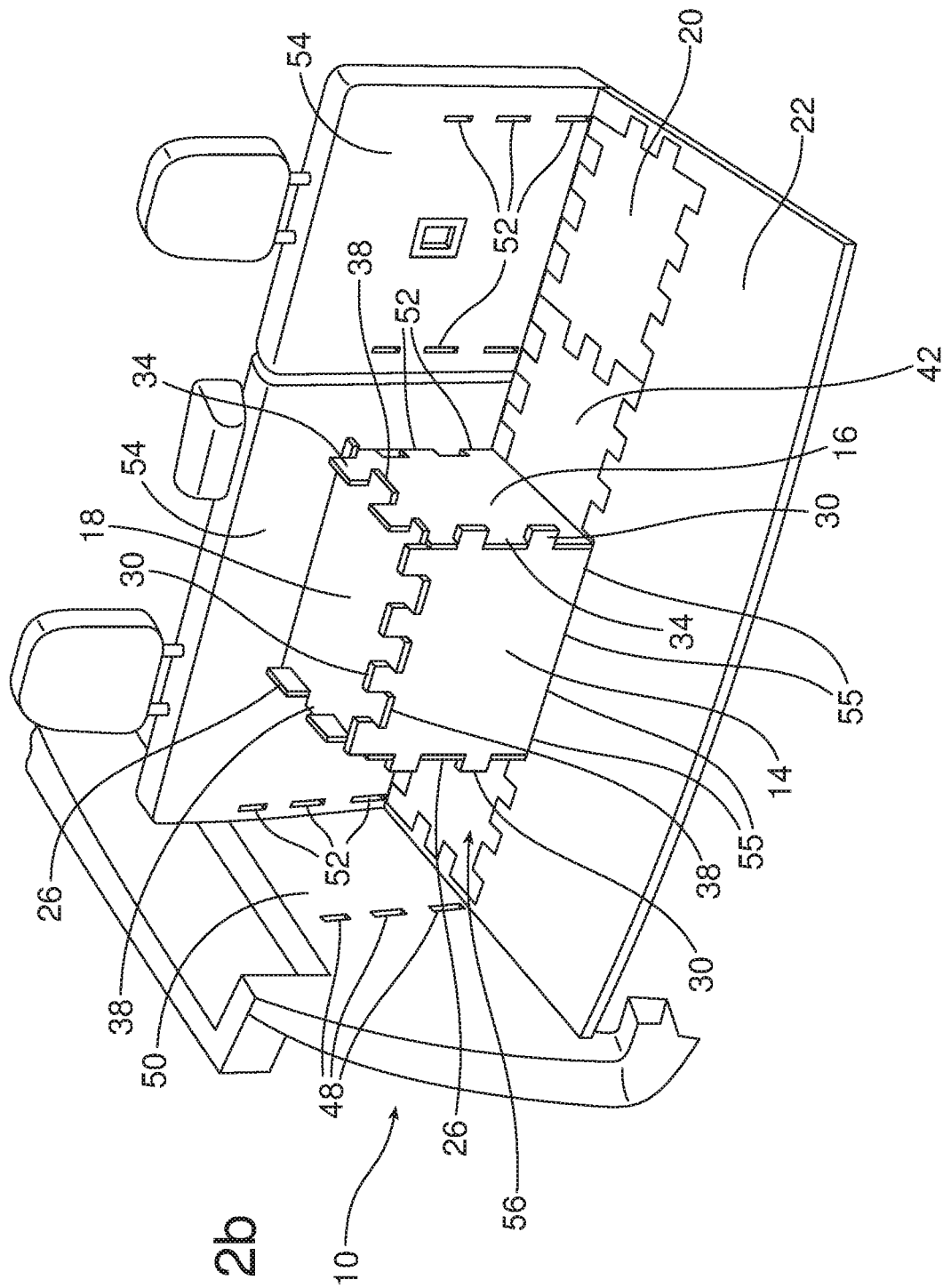
Figure 2C:
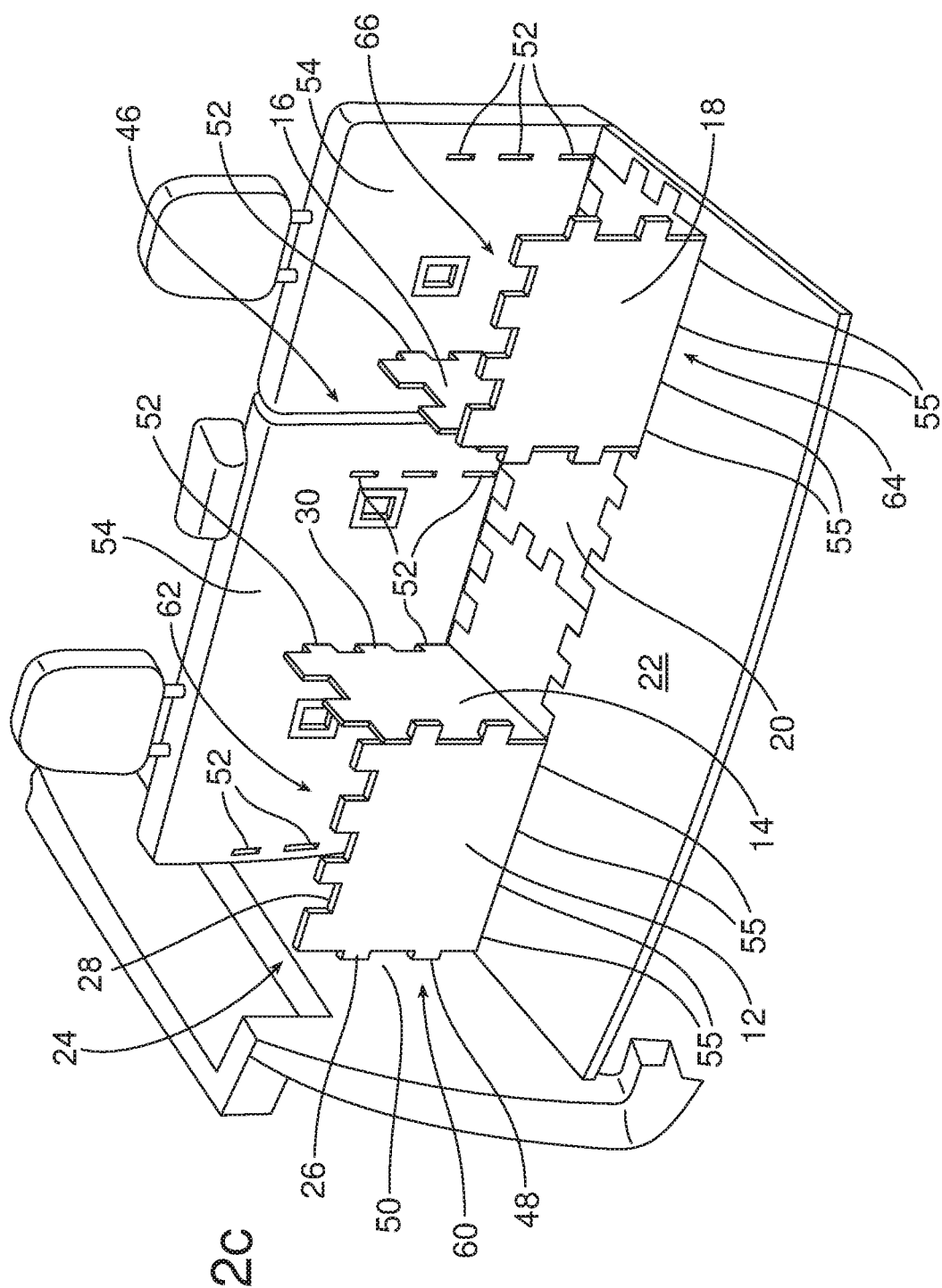

As should be apparent from reviewing FIGS. 2a-2c, the plurality of panels 12, 14, 16, 18 may be removed from the receiver 20 in the cargo compartment floor 22 and pieced together or erected into a plurality of different configurations so as to form different multiwalled structures defining a storage compartment with a confined space to retain and protect small items at different locations within the greater expanse of the cargo compartment 46. Toward this end a first set of lug receivers 48 are provided in the sidewalls 50 of the cargo compartment 46. Additionally, a second set of lug receivers 52 are provided in a rear face of the rear seat 54 oriented toward the cargo compartment 46. A third set of lug receivers 55 are provided in the recessed bottom wall of the receiver 20.

Reference is now made to FIG. 2a illustrating a first multiwalled structure 56 wherein at least one lug 26 of the first panel 12 is engaged in at least one lug receiver 52 in the rear seat 54. As illustrated, the lug 30 received in the lug receiver 52 is on a first side or edge of the first panel 12 facing motor vehicle forward. Other lugs 30 along the bottom side or edge of the first panel 12 are engaged in the underlying lug receivers 55 in the receiver 20 formed in the cargo compartment floor 22.

Similarly, at least one lug 34 on the motor vehicle forward side or edge of the third panel 16 is received in another lug receiver 52 on the rear seat 54. Lugs 34 along the bottom side or edge of the third panel 16 are engaged in the lug receivers 55 in the receiver 20 in the cargo compartment floor 22. Lugs 26 on the first panel 12 and lugs 34 on the third panel 16 oriented motor vehicle rearward engage in notches 32 at opposite ends of the second panel 14. The lugs 30 at the left end of the second panel 14 engage in the notches 28 of the first panel 12 while the lugs 30 at the right end of the second panel 14 engage in notches 36 in the third panel 16. Finally, lugs 26 along the bottom side or edge of the second panel 14 engage with the lug receivers 55 of the receiver 20 in the cargo compartment floor 22.

The engagement of the first set of crenulations 24 on the first, second and third panels 12, 14, 16 with the lug receivers 55 ensures that the first multiwalled structure 56 is retained in position and will not shift along the cargo compartment floor 22. Small and delicate items may be stored and protected from rolling or shifting and any damage that may result from that rolling or shifting in the confined space defined within the structure 56. Note particularly the storage compartment 58 for those small items formed between the first panel 12, the second panel 14, the third panel 16 and the face of the rear seat 54.

As illustrated in FIG. 2b, if desired, the fourth panel 18 may be removed from the receiver 20 and positioned over the open top of the storage compartment 58 interdigitating the lugs 38 and notches 40 on the fourth panel 18 with the lugs 26 and notches 28 on the first panel 12, the lugs 30 and notches 32 on the second panel 14 and the lugs 34 and notches 36 on the third panel 16. The lugs 38 of the fourth panel 18 oriented toward the seat may be received and held in cooperating lug receivers 52 in the face of the rear seat 54. This provides a closed top for the first multiwalled structure 56.

FIG. 2c illustrates an alternative configuration wherein the first panel 12 and second panel 14 are utilized to erect a first multiwalled structure 60 having a first storage compartment 62 at one side of the cargo area and the third panel 16 and fourth panel 18 are utilized to construct a second structure 64 with a second storage compartment 66 at a second side of the cargo compartment 46.

More specifically, lugs 26 along a left side or edge of the first panel 12 are engaged in lug receivers 48 in the sidewall 50. The lugs 26 along the bottom side or edge of the first panel 12 are interdigitated with the lug receivers 55 in the receiver 20 in the cargo compartment floor 22. The lugs 26 and notches 28 of the first set of crenulations 24 on the right side or edge of the first panel 12 are interdigitated with the lugs 30 and notches 32 on the rearwardly oriented side or edge of the second panel 14. The lugs 30 on the bottom side or edge of the second panel 14 are interdigitated with the lug receivers 55 of the receiver 20 in the cargo compartment floor 22 and at least one of the lugs 30 along the forwardly oriented edge or side of the second panel 14 is engaged in one of the lug receivers 52 in the rear seat 54. Thus, the first storage compartment 62 is defined between the sidewall 50, the face of the rear seat 54, the first panel 12 and the second panel 14.

The second multiwalled structure 64 forming the second storage compartment 66 between the third panel 16, the fourth panel 18, the opposite sidewall 50 and the face of the rear seat 54 is constructed in the same manner from the third and fourth panels.

Figure 3B:
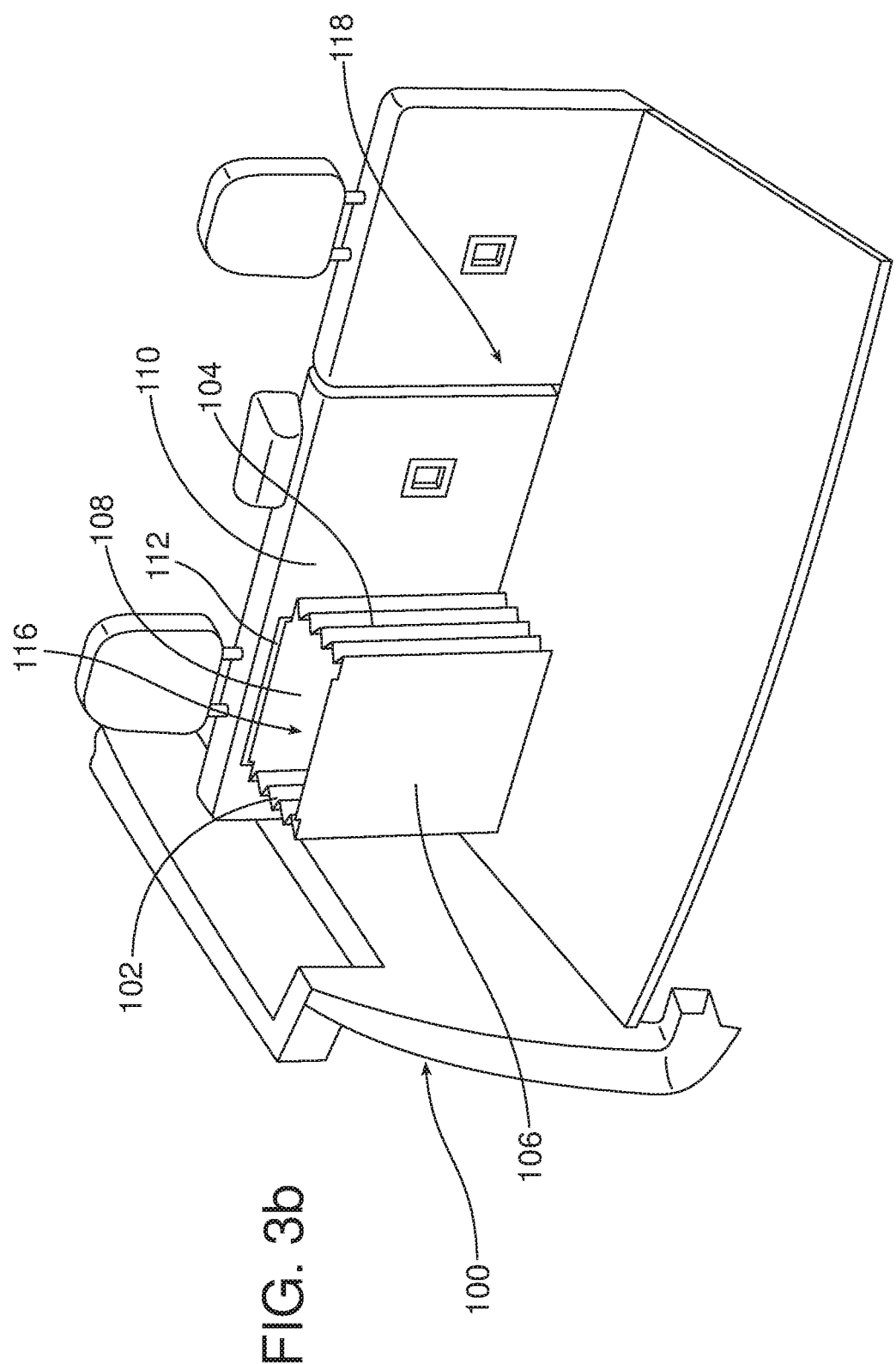

A second embodiment of storage system 100 is illustrated in FIGS. 3a and 3b. Storage system 100 includes a first accordion sidewall 102, a second accordion sidewall 104, a first end wall 106 spanning the first accordion sidewall and the second accordion sidewall and a second end wall 108 connected to the first accordion sidewall, the second accordion sidewall and a face of the rear seat 110. A receiver 112 is provided in the face of the rear seat 110. The receiver 112 in the illustrated embodiment comprises a recess. The second end wall 108 nests inside the receiver 112 and is fixed to the rear seat 110 by a releasable fastener (not shown). That releasable fastener may comprise a hook and loop fastener or other appropriate structure.

As illustrated in FIG. 3a, when the storage system 100 is in the stowed configuration, the first accordion sidewall 102 and the second accordion sidewall 104 are collapsed into a flat configuration so that the first accordion sidewall 102, the second accordion sidewall 104 and the first end wall 106 all rest against the rear seat 110. A fastener such as a hook and loop fastening device 114 may be utilized to retain the storage system in the stowed position. Note particularly the straps 114 to retain the storage device in the stowed position. Each strap 114 has a proximal end fixed to the rear face of the rear seat 110 and a distal end releasably secured to the first end wall 106 by cooperating hook and loop fastening features.

As illustrated in FIG. 3b, when the straps 114 are released, the storage system 10 may be erected by expanding the first and second accordion sidewalls 102, 104 and thereby forming a storage compartment 116 between the first accordion sidewall 102, the second accordion sidewall 104, the first end wall 106 and the second end wall 108. That compartment may also include an accordion bottom wall (not shown) if desired to provide a closed bottom storage compartment 116 wherein the bottom wall can expand with the sidewalls 102, 104. The fixing of the second end wall 108 to the rear seat 110 holds the storage system 100 in position within the greater expanse of the cargo compartment 118 of the motor vehicle.

Reference is now made to FIGS. 4a-4e illustrating a third embodiment of storage system 200. That storage system 200 includes a storage container 202 having a first sidewall 204, a second sidewall 206, a third sidewall 208 and a fourth sidewall 210 all depending from a bottom wall 212. The sidewalls 204, 206, 208, 210 may all be made from a flexible material such as a fabric, nylon, nylon netting or the like. The bottom wall 212 is made from a rigid material. A first support post 214 is provided between the first sidewall 204 and the second sidewall 206. A second support post 216 is provided between the second sidewall 206 and the third sidewall 208. A third support post 218 is provided between the third sidewall 208 and the fourth sidewall 210. A fourth support post 220 is provided between the fourth sidewall 210 and the first sidewall 204. The posts 214, 216, 218, 220 may be sewn into pockets where the sidewalls 204, 206, 208, 210 meet and form the corners of the erected storage container (see particularly FIGS. 4c and 4d). The storage container 202 may also include an upper rim 222 made of a rigid or semi-rigid material that also may be sewn in a pocket outlining the access opening of the fully erected storage container 202 opposite the bottom wall 212.

Figure 4A:
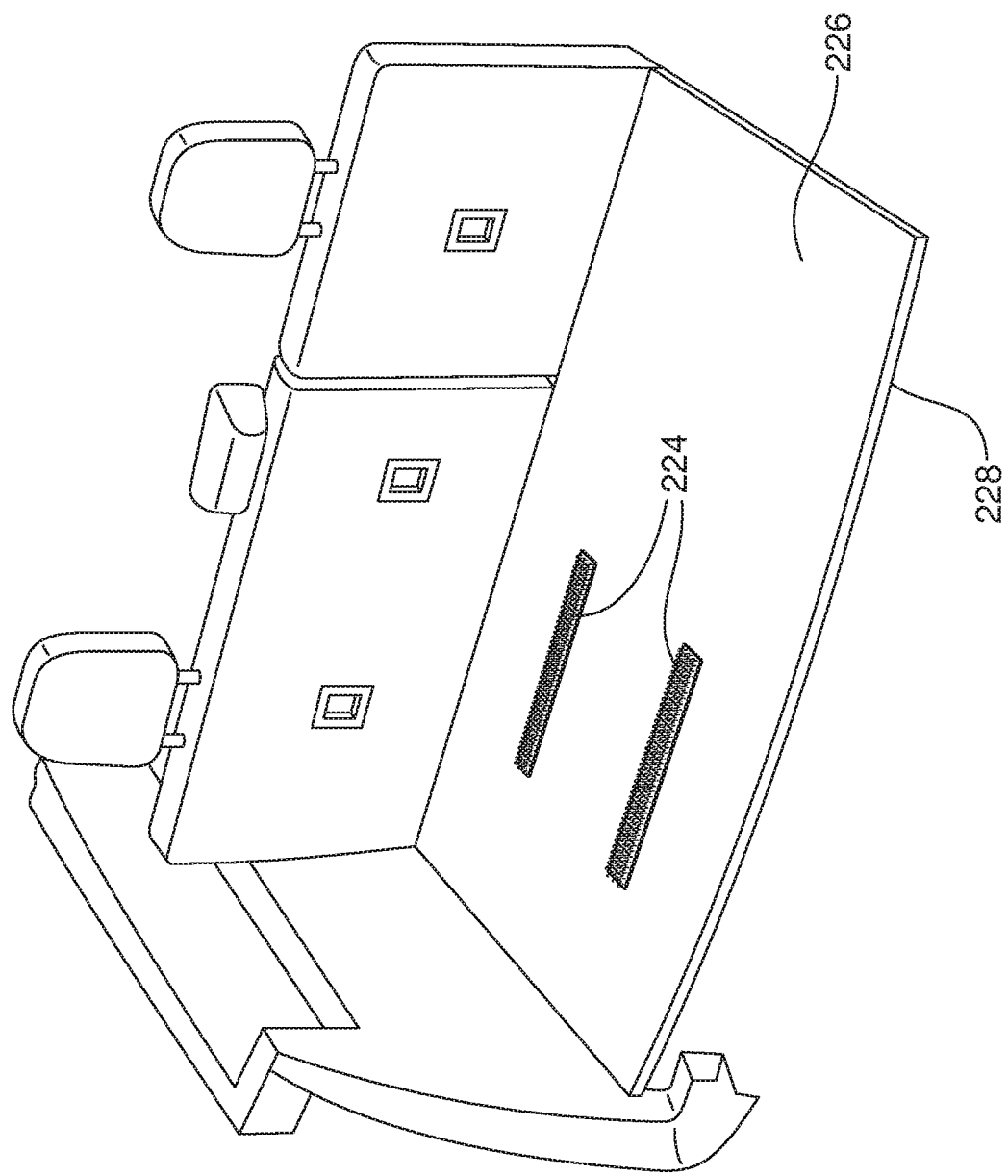

The storage system 200 also includes a first fastening element 224 on a first side 226 of the storage compartment floor 228 (See FIG. 4a) and a second fastening element 230 on a second side 232 of the storage compartment floor (See FIG. 4b). In the illustrated embodiment, the first fastening element 224 and the second fastening element 230 both comprise strips of hook and loop fastening tape sewn, adhered or otherwise attached to the storage compartment floor 228.

Figure 4C:
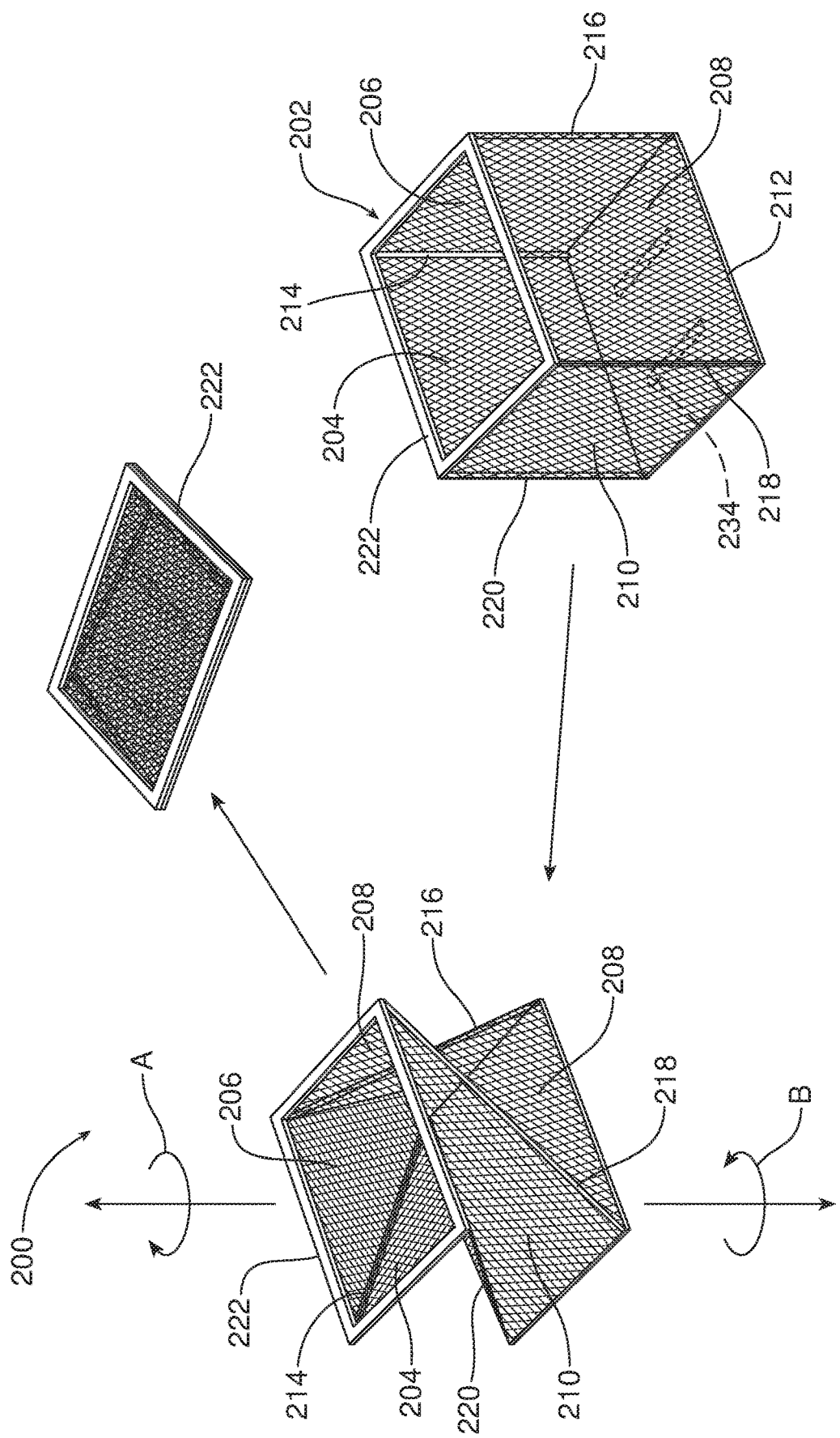
Figure 4D:
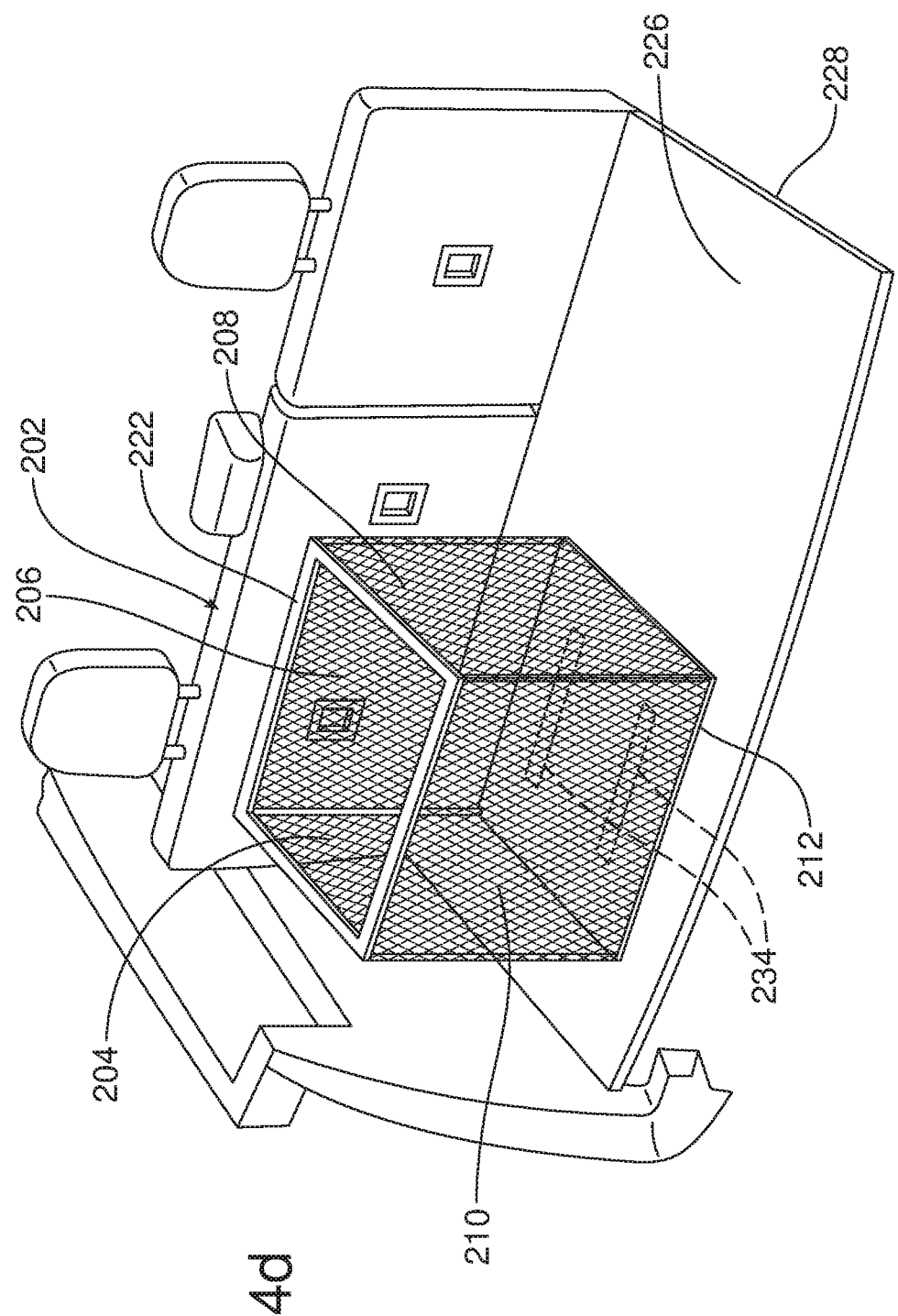
Figure 4E:
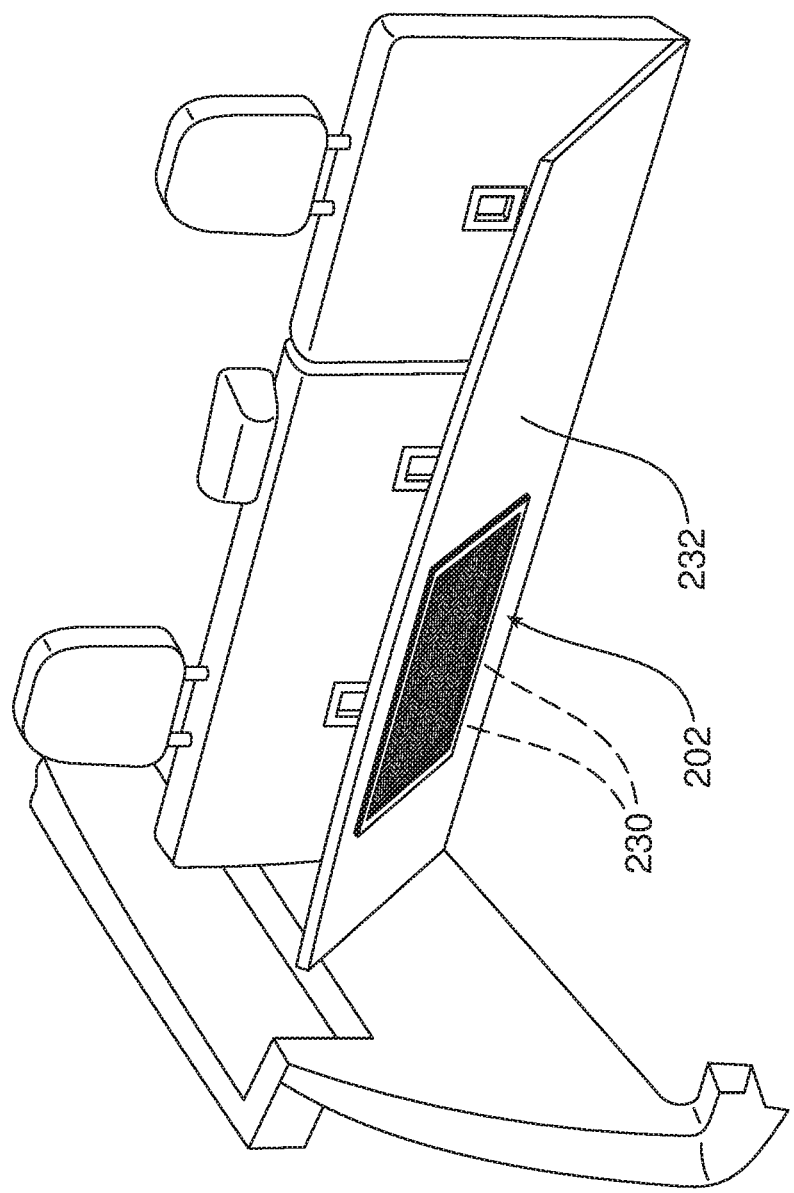

A third fastening element 234 is fixed to the lower face of the bottom wall 212 of the storage container 202 (see FIGS. 4c and 4d). The third fastening element 234 may be releasably secured to either of the first fastening element 224 on the first side 226 of the storage compartment floor 228 or the second fastening element 230 on the second side 232 of the storage compartment floor 228. FIG. 4e illustrates the storage container 202 in a collapsed and flat configuration, secured by the third fastening element 234 to the second fastening element 230 on the lower or second side 232 of the storage compartment floor 228. When the storage compartment floor 228 is then lowered down into a horizontal position, it should be appreciated that the storage compartment floor conceals the storage container 202 from view.

Reference is now made to FIG. 4c illustrating how one reconfigures the storage container 202 between the collapsed and flat configuration for stowing and the fully erected configuration for storing items. More specifically, when seeking to erect the storage container 202, one lifts the rim 222 and rotates in the direction of action arrow A. This movement causes the four posts 214, 216, 218 and 220 to pivot at their ends where the posts meet the rigid bottom wall 212 and rigid rim 222. Thus, the posts 214, 216, 218, 220 are displaced from a substantially horizontal position to a vertical or fully erected position. FIG. 4d illustrates the fully erected storage container 202 secured to the upper face 226 of the storage compartment floor 228 by engagement of the third fastening element 234, fixed to the bottom wall 212 of the storage container, with the first fastening element 224 fixed to the storage compartment floor 228.

When one wishes to convert the storage container 202 from the fully erected position to the fully collapsed and flat position one rotates the rim 222 in the opposite direction (see action arrow B) while gently pushing downward on the rim toward the bottom wall 212.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A storage system, comprising:
a plurality of panels having perimeters including a first set of crenulations allowing said plurality of panels to be interconnected into a multiwalled structure defining a storage compartment;
a receiver formed in a cargo compartment floor, said plurality of panels being received and held in said receiver when stowed; and
a first set of lug receivers in sidewalls of a cargo compartment and a second set of lugs receivers in a rear face of a rear seat oriented toward said cargo compartment wherein said first set of crenulations include a plurality of alternating projecting lugs and notches and said receiver comprises a recessed bottom wall and a plurality of sidewalls having a second set of crenulations cooperating to receive and hold said first set of crenulations.

2. The storage system of claim 1, further including a third set of lug receivers in said recessed bottom wall.

3. The storage system of claim 2, wherein said projecting lugs of at least one panel of said plurality of panels are received in lug receivers in said sidewalls of said cargo compartment and said third set of lug receivers in said recessed bottom wall.

4. The storage system of claim 3, wherein said projecting lugs of a second panel of said plurality of panels are received in said lug receivers in said rear face of said rear seat and said notches of said at least one panel of said plurality of panels.

5. The storage system of claim 2, wherein said projecting lugs of at least one panel of said plurality of panels are received in lug receivers in said rear face of said rear seat and said third set of lug receivers in said recessed bottom wall.

6. A storage system, comprising:
a plurality of panels having perimeters including a first set of crenulations allowing said plurality of panels to be interconnected into a multiwalled structure defining a storage compartment, wherein said first set of crenulations include a plurality of alternating projecting lugs and notches; and
a first set of lug receivers in sidewalls of a cargo compartment and a second set of lugs receivers in a rear face of a rear seat oriented toward said cargo compartment.

7. The storage system of claim 6, further including a third set of lug receivers in said recessed bottom wall.

8. The storage system of claim 7, wherein said projecting lugs of at least one panel of said plurality of panels are received in lug receivers in said sidewalls of said cargo compartment and said third set of lug receivers in said recessed bottom wall.

9. The storage system of claim 8, wherein said projecting lugs of a second panel of said plurality of panels are received in said lug receivers in said rear face of said rear seat and said notches of said at least one panel of said plurality of panels.

10. The storage system of claim 7, wherein said projecting lugs of at least one panel of said plurality of panels are received in lug receivers in said rear face of said rear seat and said third set of lug receivers in said recessed bottom wall.

* * * * *